Aug. 20, 1940.  J. W. SCHAFER  2,212,327
ACCESSORY FOR WHEELED VEHICLES
Filed Oct. 12, 1939  5 Sheets-Sheet 2

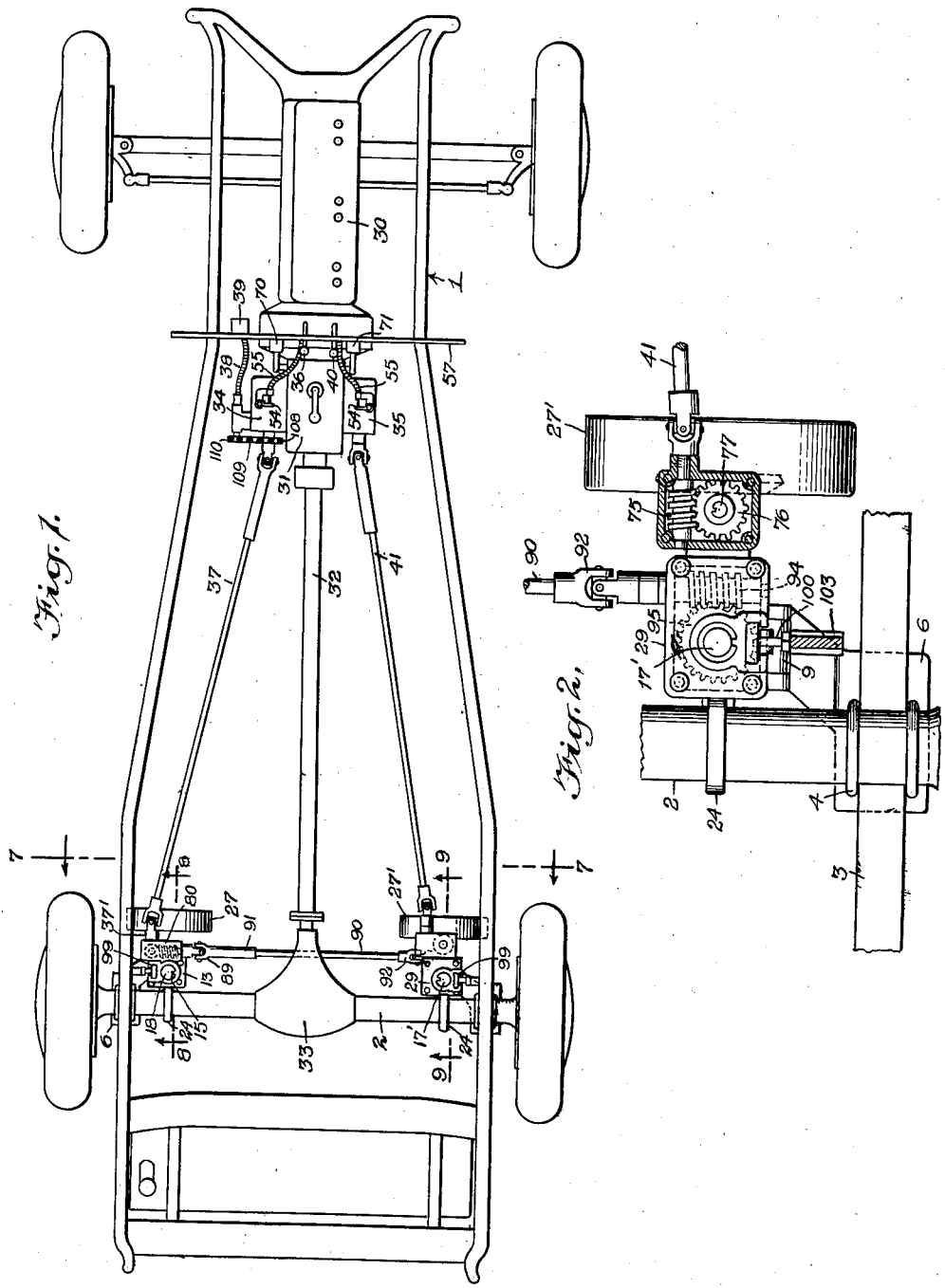

WITNESSES

INVENTOR
John W. Schafer
BY
ATTORNEYS

Aug. 20, 1940.    J. W. SCHAFER    2,212,327
ACCESSORY FOR WHEELED VEHICLES
Filed Oct. 12, 1939    5 Sheets-Sheet 3
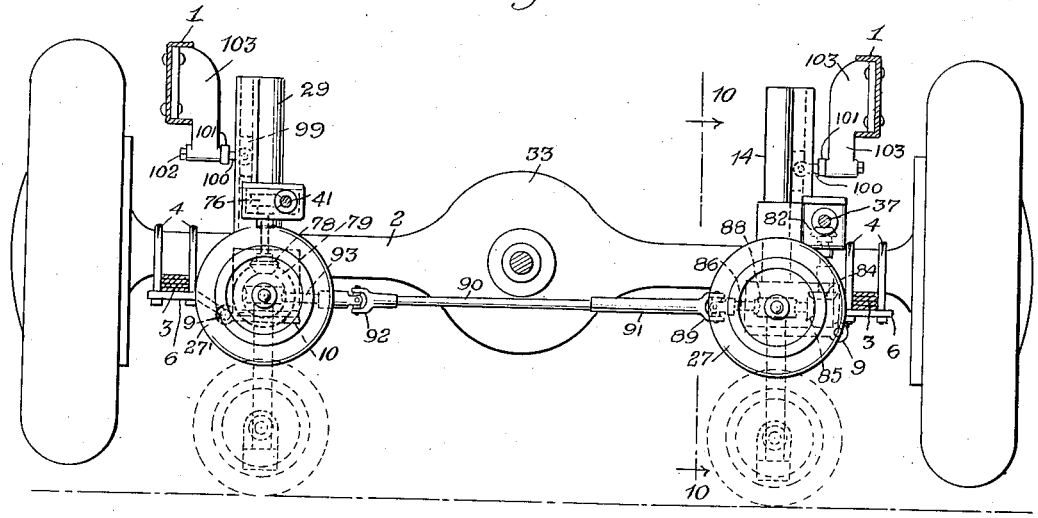
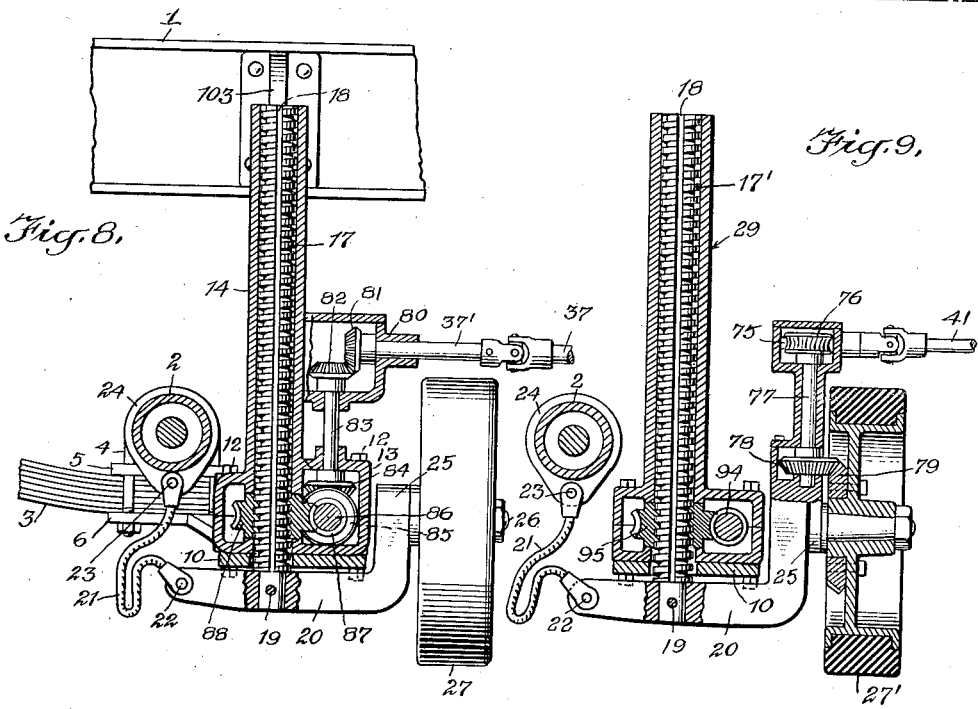
WITNESSES
INVENTOR
John W. Schafer
BY
ATTORNEYS

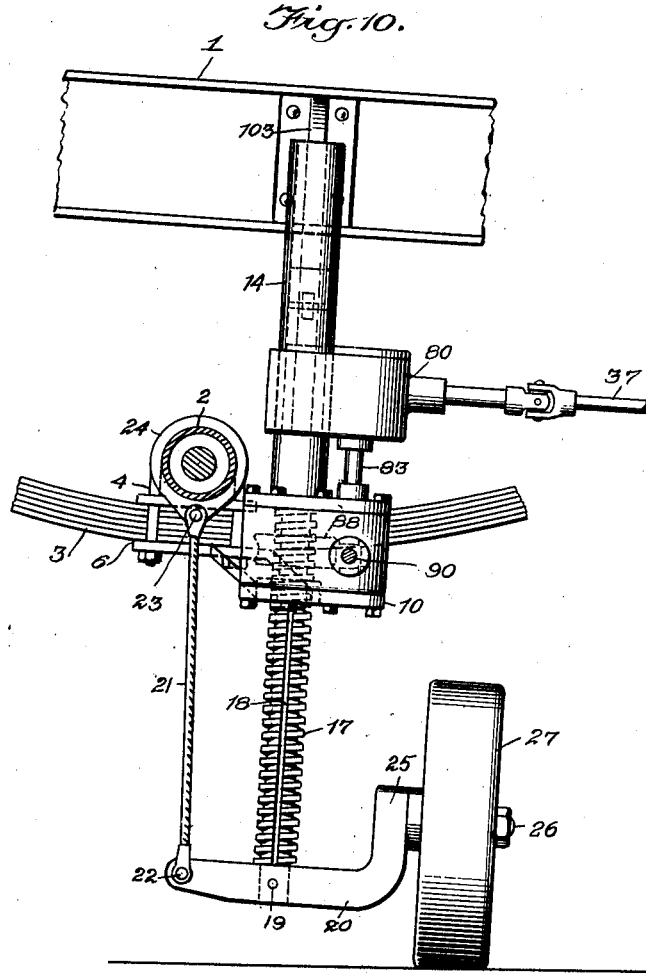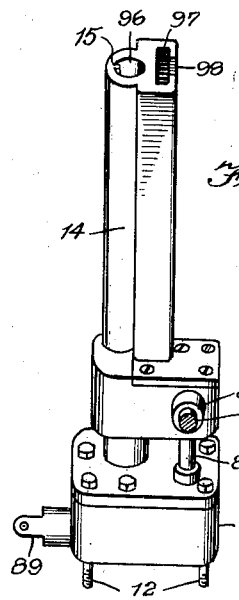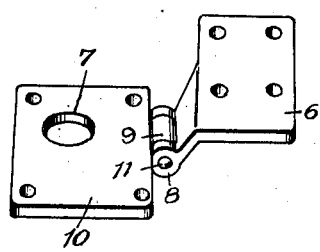

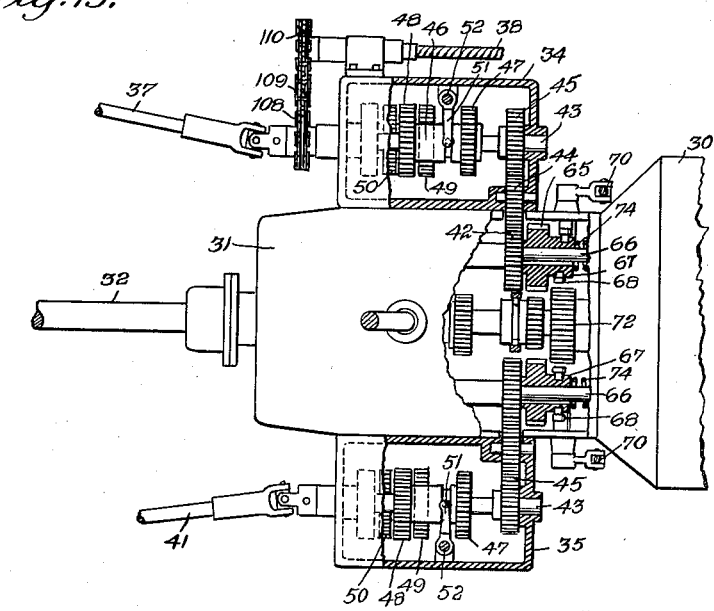
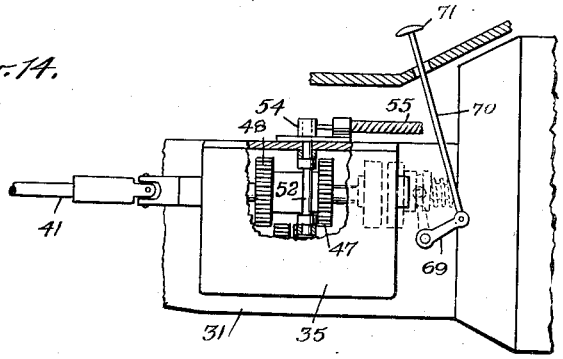
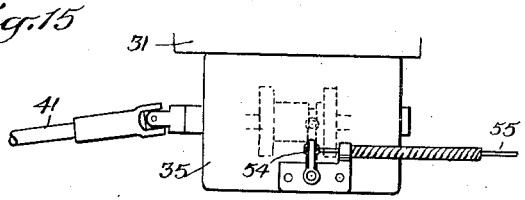

Patented Aug. 20, 1940

2,212,327

UNITED STATES PATENT OFFICE 2,212,327

ACCESSORY FOR WHEELED VEHICLES

John W. Schafer, Brooklyn, N. Y.

Application October 12, 1939, Serial No. 299,118

5 Claims. (Cl. 180—1)

This invention relates to wheeled vehicles and particularly to an improved accessory therefor, an object being to provide a construction which may be actuated by the power element of the vehicle for parking the vehicle in a restricted space.

Another object of the invention is to provide an accessory for a wheeled vehicle having an engine wherein power may be taken from the engine for jacking up the rear part of the vehicle.

Another object of the invention is to provide in a wheeled vehicle, means adjacent the rear thereof for raising the rear of the vehicle and swinging the same in either direction.

An additional and more specific object of the invention is to provide in a wheeled vehicle having a power driving element, jacks at the rear of the vehicle associated with means for transmitting power from the power element of the vehicle to the jacks for raising the vehicle and also swinging the same, the structure being such that indicating means are presented on the instrument board of the vehicle for indicating the amount of elevation of the rear of the vehicle.

In the accompanying drawings—

Fig. 1 is a top plan view of the chassis of a wheeled vehicle provided with an accessory embodying the invention;

Fig. 2 is an enlarged detail fragmentary view of one of the jacks and associated parts shown in Fig. 1, a portion being shown in section for better illustrating the construction;

Fig. 7 is an enlarged sectional view through Fig. 1 approximately on the line 7—7;

Fig. 8 is an enlarged fragmentary sectional view through Fig. 1 on the line 8—8;

Fig. 9 is an enlarged fragmentary sectional view through Fig. 1 approximately on the line 9—9;

Fig. 10 is a sectional view through Fig. 7 approximately on the line 10—10;

Fig. 11 is a perspective view of the guiding casing shown in Fig. 10;

Fig. 12 is a perspective view of a seat and hinged bracket associated therewith embodying certain features of the invention;

Fig. 13 is an enlarged plan view of the transmission shown in Fig. 1 with certain parts broken away for better illustrating the invention;

Fig. 14 is a side view of the structure shown in Fig. 13, with certain parts broken away to illustrate the connection of the control with the gear shift;

Fig. 15 is a top plan view of the structure shown in Fig. 14.

Figure 3:
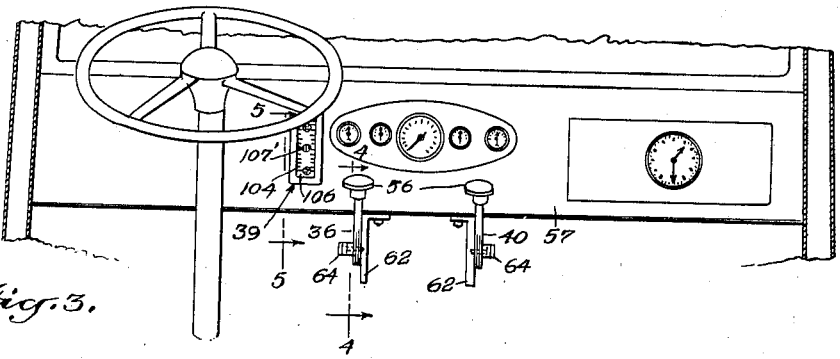
Fig. 3 is a fragmentary perspective view showing the instrument board of the vehicle shown in Fig. 1 and illustrating certain features of the invention as applied thereto.

Referring to the accompanying drawings by numerals, 1 indicates the chassis of an automobile or any other desired form of wheeled vehicle. The chassis is supported at the front and at the rear in the usual way of automobiles. The rear support for the chassis includes an axle casing 2 and suitable springs 3. The springs are connected to the axle casing 2 by suitable U-bolts 4 of any desired or preferred structure. As shown particularly in Fig. 8, a washer or plate 5 is arranged above the spring and a special plate or bracket 6 is arranged below the spring. The respective U-bolts 4 extend through these two plates, whereby these plates are firmly clamped to the spring and the spring in turn is firmly secured to the axle casing 2. The special plate 6 is shown in Fig. 12 and is provided with hinge knuckles 8. A hinge ear 9 extending from seat 10 accommodates a pintle 11 for connecting seat 10 to plate 6. Plate 10 is provided with an aperture 7 for permitting screw 17 to slide therethrough when the jack is being raised or lowered. As shown in Fig. 8, plate 10 is clamped by suitable bolts 12 to a casing 13, which casing has an upstanding auxiliary casing 14 provided with a key 15 (Fig. 11). This construction permits a slight swinging action for casing 14. Casing 14 accommodates a screw 17 having a slot 18 which accommodates the key 15. The structure just described presents the major part of a jack for elevating the rear of the automobile.

The lower end of the screw member 17 is secured, as for instance by a pin 19, to the bar 20. Bar 20 at one end has a cable 21 pivotally connected therewith through the action of a pin 22. Cable 21 is also pivotally connected at 23 to a ring 24 mounted on the axle casing 2. At the opposite end of bar 20, an upstanding section 25 is provided in which a stub shaft 26 is secured. A traction wheel 27 is rotatably mounted on the shaft 26. When mechanism hereinafter fully described is actuated for causing the threaded member 17 to move downwardly, for instance to the position shown in Fig. 10, the traction wheel 27 will engage the ground and the rear end of the automobile will be raised. The limit of the action of the screw 17 is the length of the cable 21. When the jack is in its farthest down position, cable 21 is taut and produces an equalizing structure in respect to the wheel 27. After the jack has been moved to the position shown in Fig. 10, it may be left in that position or retracted.

As shown in Fig. 1 of the drawings, the jack shown in Fig. 8 is at the left side of the automobile when looking from the rear to the front. At the right side of the automobile when looking in the same direction, a jack 29 is provided which is identical in all respects with the jack shown in Fig. 8 and the same reference numerals will therefore be used for this jack. However, the jack shown in Fig. 8 and the jack 29 are adapted to function simultaneously to raise the rear of the automobile and then, if desired, mechanism associated with the jack 29 may be used for rotating the wheel 27' for shifting the rear of the automobile laterally either to the right or left. From Fig. 1 it will be observed that the axis of the respective wheels 27 and 27' are at right angles to the axes of the wheels of the automobile. By reason of this fact, whenever wheel 27' is rotated it will shift the rear of the automobile laterally. The jacks just described may be used merely to raise and lower the rear of the automobile or may be used to raise the rear of the automobile and then swing the same laterally into a parked position. The rear of the automobile could then be lowered and the jacked wheels 27 and 27' raised to the position shown in Fig. 7.

As illustrated particularly in Fig. 1, the automobile is provided with a prime mover, as for instance an engine 30, which may be any desired kind of engine. This engine is connected through suitable transmission 31 to the drive shaft 32, which shaft is connected through a differential and housing 3 to the rear axles of the automobile and there in turn are connected to the rear wheels. The construction just described is old and well known. Associated with the transmission mechanism 31 are auxiliary transmission mechanisms 34 and 35 which are of special construction. By manipulating the hand lever 36, power may be taken from the transmission mechanism 31 through the mechanism 34 for rotating the shaft 37 and also for driving the flexible shaft 38 which in turn will drive the mechanism in the indicator 39. By manipulating the hand lever 40, power may be taken from the transmission mechanism 31 and transmitted through mechanism 35 to the shaft 41 for rotating the same. In this way, power may be transmitted at different times or at the same time to shafts 37 and 41. When shaft 37 is being rotated the jacks at the rear will be raised or lowered, and when shaft 41 is being rotated power is transmitted to wheel 27' for rotating the same, whereby the automobile may swing to the right or left according to the direction of rotation of shaft 41. As shown in Figs. 13, 14 and 15, power is transmitted from gear wheel 42 of the transmission mechanism 31, which is of any usual or preferred kind, to the shaft 43 through an idler 44 and through gear 45 which is rigidly secured to the shaft 43. A sleeve 46 is splined to shaft 43, said sleeve having gear wheels 47 and 48. The gear wheels 47 and 48 may be associated with other gears, as for instance, gears 49 and 50, to provide a forward drive and a reverse drive for the shaft 37. An arm 51 is adapted to slide the sleeve 46 and associated parts to move the gear wheels into neutral position, or into the forward drive position or the rearward drive position. Arm 51 is rigidly secured to a rock shaft 52, which shaft extends through the casing 53 so that the lever 54 may be rigidly secured thereto. A Bowdin wire 55 has one end rigidly secured to arm 51, as shown in Fig. 1. This wire extends to and is secured to lever 36, as shown more in detail in Fig. 4. As shown in this figure, 57 indicates the instrument board and to this board is secured a bracket 58 and also a bracket 59. Lever 36 is pivotally mounted at 60 on bracket 59. An arc-shaped guide 62 is also bolted or otherwise rigidly secured to the instrument board and is provided with three depressions 63. These depressions are equally spaced and the end of a screw 64 is adapted to snap into any of these depressions or apertures. The screw 64 is carried by lever 36 and extends a short distance therebeyond so that when the knob 56 is pulled downwardly the end of the screw 64 will move out of the depression in which it is located and slide along the bracket 62 and snap into the next depression 63.

Figure 4:
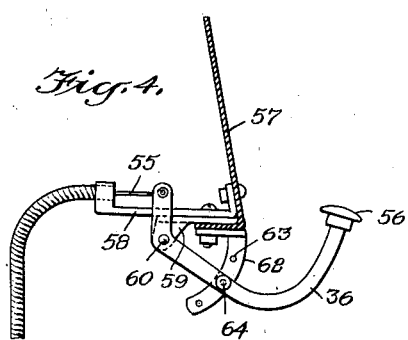
Fig. 4 is an enlarged fragmentary sectional view through Fig. 3 on the line 4—4.

As shown in Fig. 4, the parts are set in their neutral position. When the lever 36 is pulled downwardly, it will automatically stop at the lowermost depression 63 and when it is pulled upwardly to its fullest extent it will stop at the highest depression 63. When the lever is pulled downwardly, shaft 37 will rotate in a direction for raising the rear of the automobile. When the lever 36 is moved to its extreme upward position shaft 37 will rotate in the opposite direction for lowering the rear of the automobile. When the lever 36 is in the central position, as shown in Fig. 4, the various gears, etc., shown in Fig. 13 will be in neutral. The lever 40 and associated parts are identical with lever 36 and associated parts and, therefore, will need no additional description. The same reference numerals will also be used in respect to lever 40.

Referring again to Fig. 13, it will be seen that the gear wheel 65 is splined on the shaft extension 66 and is provided with a hub 67 having an annular groove cooperating with a yoke 68. Yoke 68 is connected with a lever 69, as shown in Fig. 14, which lever carries at its outer end a rod 70 having a knob or pedal 71 at the upper end. Rod 70 extends through the floor of the automobile so that after the lever 36 has been adjusted to drive shaft 37 forwardly or rearwardly, rod 70 is depressed, whereupon the gear 67 will move into mesh with the gear 72 forming part of the usual transmission of the automobile. If the engine is running, power will then be transmitted to shaft 37. To shut off this power it is only necessary to raise the foot from the rod 70 and spring 74 will push gear 65 out of mesh. This will instantly stop the transmission of power to shaft 37.

An identical structure is provided with respect to the auxiliary transmission mechanism 35 and, therefore, no additional description is thought to be necessary. It will thus be seen that the levers 36 and 40 may be adjusted back and forth to the desired positions while the engine is running and while the automobile is standing still without transmitting any power to the jack.

After the levers and associated parts have been properly adjusted, the rod 70 (Fig. 14) associated with the auxiliary transmission 34 may be actuated for raising and lowering the jacks.

After the jacks have raised the rear of the automobile to the desired height, the foot is removed from the pedal 71 and then if it is desired to swing the automobile to the right or left, lever 40 is adjusted to the desired position and then the rod 70 of the auxiliary transmission 35 is depressed. This will transmit power to shaft 41 and to the wheel 27', and as this wheel rotates the rear of the automobile will be swung in the desired direction. As shown in Figs. 7 and 8, as the shaft 41 rotates it will rotate the worm 75 which in turn will rotate the worm wheel 76. A shaft 77 is rigidly secured to the worm wheel 76 and also to a bevel gear 78. Bevel gear 78 is in continual mesh with a bevel gear 79 rigidly secured by bolts or otherwise to the wheel 27'. In this way power is transmitted to wheel 27' for causing the same to swing the rear of the automobile either to the right or left. It will be understood that usually power is not transmitted to wheel 27' until after the same has been used to lift the rear of the automobile though if it is done before the wheel is lowered nothing objectionable will happen as the wheel will merely rotate idly. When the shaft 37 is rotated it will rotate the auxiliary shaft 37', as shown in Fig. 8. Auxiliary shaft 37' is carried by a housing 80 secured in any desired way to the housing 14. A bevel gear 81 is rigidly secured to shaft 37' and is continually in mesh with a bevel gear 82 secured to shaft 83, which latter shaft is rigidly secured to a bevel gear 84 continually in mesh with a bevel gear 85 positioned in casing 13. A shaft 86 is rigidly secured to the bevel gear 85 and carries a worm 87 which is continually in mesh with a worm wheel 88 rotatably carried by the casing 13. The bore of the worm wheel 88 is threaded and this wheel is screwed on to the jack screw 17, as shown particularly in Fig. 8. By reason of this construction, whenever shaft 37 rotates power will be transmitted to the worm wheel 88 and to the jack screw 17 for raising or lowering the same. In addition, power from the shaft 86 will be transmitted through the universal joint 89 (Fig. 7) to a transversely extending hollow shaft 91 which slidingly receives shaft 90. The shaft 90 may be square and the bored in shaft 91 may be also square or the parts may be round and a key and keyway used so that the shafts 90 and 91 may rotate in unison though allowed an independently sliding movement in respect to each other. Shaft 90 is connected through a universal joint 92 to a shaft 93, which latter shaft carries a worm 94 (Fig. 9) which is continually in mesh with a worm wheel 95 having a threaded bore for accommodating the jack screw 17' of jack 29. By means of the construction just described, whenever power is transmitted to the jack screw 17 for raising or lowering the same, power will also be transmitted to the jack screw 17' so that both of these screws will move upwardly or downwardly in unison and will both receive power from shaft 37 for securing this result. Each of the jack screws is provided with a housing 14, as shown particularly in Fig. 11. This housing is provided with a bore 96 for receiving the jack screw and a rectangular slideway 97 having a slot 98. A shoe 99 (Fig. 7) fits into the slideway 97 and from this shoe a shaft 100 extends, said shaft projecting through slot 98. Shaft 100 is clamped by suitable nuts 101 and 102 to a bracket 103 riveted or otherwise rigidly secured to the chassis 1, as shown in Fig. 7. As the bracket 103 and associated parts described in respect to the left part of the machine, as shown in Fig. 7, is identical with that on the right side, the same reference numerals will apply. This construction coacts with the member 10 shown in Fig. 12 so that if there should be a slight upward movement of either end of the axle casing 2 independent of the chassis, the hinge structure shown in Fig. 12 will compensate for this slight difference in angle of the respective parts. The shoe 99 and associated parts is intended principally to maintain the casing 14 and associated parts extending vertically so that the jack screws will normally move vertically upwardly and downwardly.

Figure 6:
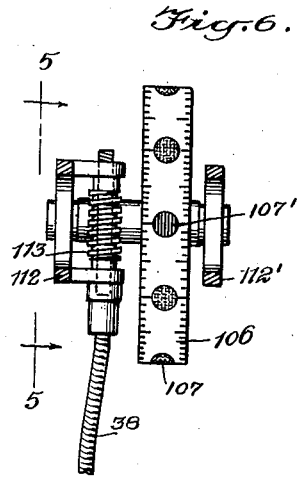
Fig. 6 is a fragmentary sectional view through Fig. 5 approximately on the line 6—6.
Figure 5:
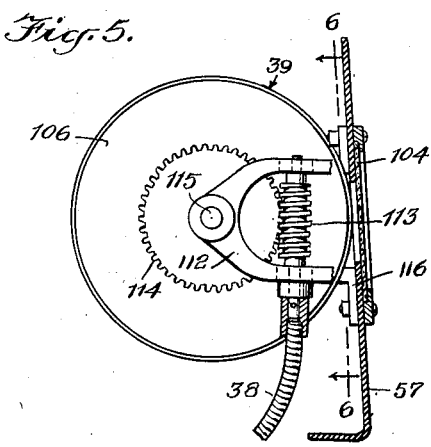
Fig. 5 is an enlarged fragmentary sectional view through Fig. 3 on the line 5—5 and also through Fig. 6 on the line 5—5.

Referring more particularly to Figs. 3, 5 and 6, it will be seen that there is provided a telltale indicating or warning device 39 for indicating to the operator when the jacks have been raised or lowered. A window 104 is provided in the instrument board 57 and in back of this window there is provided an indicating wheel 106. The wheel 106 has a number of spaced indicating spots 107 which may be of various colors. The spot 107' is red so that when it comes to a central point in the window 104 the operator will know that the jacks have been fully lowered and the parts are substantially in the position shown in Fig. 10. When he sees the spot 107' positioned centrally, as shown in Fig. 3, he will immediately release the pedal 70 and the spring 74 (Fig. 13) will force the gear wheel 65 out of mesh with gear wheel 72. This will immediately stop the transmission of power from the engine and the raising action will cease. When the raising action first takes place, the sprocket wheel 108 (Fig. 13) will be rotated as it is rigidly secured to the driving shaft which drives the rod 37. Chain 109 is therefore moved and will rotate the sprocket wheel 110 rigidly secured to the flexible cable 38. Flexible cable 38 extends to a position in back of the instrument board 57 and is journaled on a UU-shaped bracket 112 as shown in Fig. 5. A worm 113 is secured to the end portion of this cable so as to be rotated as the cable rotates. Worm 113 continually meshes with the worm gear 114, which worm gear is rigidly secured to shaft 115 and this shaft is rigidly secured to the wheel 106. The U-shaped bracket 112 is provided with laterally extending feet 116 which are bolted or otherwise rigidly secured to the instrument board 57. A similar bracket 112' is arranged on the opposite side of wheel 106, as shown in Fig. 6. These brackets support shaft 115 and parts carried thereby. It will be understood that the rod 37 and the flexible shaft 111 rotate in unison and rotate when the jacks are being raised and also rotated in the opposite direction when the jacks are being lowered so that wheel 106 shown in Fig. 5 will be moved all the time the jacks are being raised or lowered. One of the spots 107 may be of a special color, as for instance green, for indicating when the jack has been fully raised.

I claim:

1. An accessory for a wheeled vehicle having a chassis, front and rear supporting traction wheels and means including an engine for rotating certain of said traction wheels, a pair of jacks connected to the chassis near the rear end thereof, each of said jacks being provided with a casing connected with said chassis, a worm wheel arranged in said casing provided with a threaded bore, a jack screw extending through said threaded bore, a bar connected to the lower end of the jack screw, a wheel rotatably mounted on one end of each of said bars, the axes of said wheels extending substantially parallel with the center of said chassis, a flexible cable connected to the other end of each of said bars and to said chassis for limiting the downward movement of said bars, means for transmitting power from said engine to said worm wheel for rotating the same and thereby raise or lower said jacks, auxiliary means for transmitting power from said engine to one of the jacks and to one of said traction wheels for rotating the same whereby the rear of said chassis may be swung laterally.

2. In a device of the character described, a jack for an automobile provided with a chassis including a rear axle casing, a jack casing secured to said chassis, a worm wheel rotatably mounted in said casing and provided with a threaded bore, said casing having an inwardly extending key, a jack screw extending through said worm wheel and through the casing, said screw having a groove for receiving said key, whereby when said worm wheel rotates said jack screw will be raised or lowered but not rotated, a worm continually meshing with said worm wheel, a power shaft connected with said worm wheel for rotating the worm, a bar securing the lower end of said jack screw, a cable pivotally connected at one end of said bar, means for pivotally mounting the other end of said cable on said axle casing, a journal shaft extending from the opposite end of the bar to where said cable is connected, and a traction wheel rotatably mounted on said shaft.

3. In a device of the character described, a pair of jacks for an automobile provided with a chassis, means for connecting said jacks with the chassis near the rear wheels of the automobile, means for transmitting power from the engine of the automobile to one of the jacks for raising and lowering the same, means for transmitting power from the last mentioned jack to the other jack for simultaneously raising the other jack, each of said jacks having a rotatable traction wheel adapted to engage the ground when the jacks have been actuated for elevating the rear of the automobile, said traction wheels having their axes substantially parallel to the center of said chassis, and power transmitting means extending from the engine of the automobile to said other jack for rotating the wheel carried thereby.

4. In a device of the character described, a pair of jacks adapted to be connected to the chassis of an automobile, each of said jacks including a casing, a supporting seat connected with said casing, means for swingably connecting said supporting seat with the chassis of an automobile, said casing being mounted on said seat and formed with an extension having a tubular bore and a rectangular slideway, means secured to said chassis slidingly mounted in said slideway, said casing having a key extending into said bore, a jack screw mounted in said bore and provided with a slot for accommodating said key, a ground engaging member connected with said screw at the lower end thereof, a worm wheel arranged in said casing provided with a threaded bore for receiving said jack screw, a worm meshing with said worm wheel, and an actuating shaft secured to said worm for rotating the same and thereby raising and lowering said jack screws.

5. In a device of the character described, a pair of jacks adapted to be connected to the rear of the chassis of an automobile, means connecting said jacks so that they will be raised and lowered simultaneously, a motor driven by the engine of the automobile for actuating said jacks for raising and lowering the same, means for connecting and disconnecting said motor with the transmission of the automobile, and a flexible shaft connected with said motor and rotated simultaneously therewith, a worm rotated by said flexible shaft, said worm being positioned adjacent the instrument board of the automobile, a worm wheel actuated by said worm, an indicating wheel rigidly secured to said worm wheel, said indicating wheel having spaced indicating spots for indicating the relative positions of said jacks in respect to the ground, and a window in the instrument board of the automobile arranged in front of said indicating wheel.

JOHN W. SCHAFER.